US012045779B2

(12) United States Patent
Garg et al.

(10) Patent No.: US 12,045,779 B2
(45) Date of Patent: Jul. 23, 2024

(54) SYSTEM, METHOD, AND COMPUTER PROGRAM FOR AUTOMATICALLY REMOVING DATA FROM CANDIDATE PROFILES THAT MAY INFLUENCE BIAS (71) Applicant: Eightfold AI Inc., Mountain View, CA (US)

(72) Inventors: Ashutosh Garg, Mountain View, CA (US); Varun Kacholia, Mountain View, CA (US)

(*) Notice: Subject to any disclaimer, the term of this patent is extended or adjusted under 35 U.S.C. 154(b) by 282 days.

(21) Appl. No.: 17/319,524

(22) Filed: May 13, 2021

(65) Prior Publication Data
US 2021/0264373 A1 Aug. 26, 2021

Related U.S. Application Data (63) Continuation-in-part of application No. 17/033,575, filed on Sep. 25, 2020, now Pat. No. 11,030,404, which is a continuation of application No. PCT/US2020/012317, filed on Jan. 6, 2020, application No. 17/319,524 is a continuation of application No. 16/209,834, filed on Dec. 4, 2018, now Pat. No. 11,030,583.

(51) Int. Cl.
G06Q 10/00 (2023.01)
G06F 40/295 (2020.01)
G06N 20/00 (2019.01)
G06Q 10/0631 (2023.01)
G06Q 10/1053 (2023.01)

(52) U.S. Cl.
CPC ....... *G06Q 10/1053* (2013.01); *G06F 40/295* (2020.01); *G06N 20/00* (2019.01); *G06Q 10/063112* (2013.01)

(58) Field of Classification Search
CPC .................................................. G06Q 10/1053
See application file for complete search history.

(56) References Cited

U.S. PATENT DOCUMENTS

| 7,472,097 | B1 |  | 12/2008 | Scarborough et al. |
| 9,665,641 | B1 |  | 5/2017 | Zhang |
| 10,185,712 | B2 |  | 1/2019 | Gidney |
| 10,467,339 | B1 | * | 11/2019 | Shen ..................... G06F 40/247 |
| 10,776,758 | B1 | * | 9/2020 | Benedict ................ G06Q 50/01 |

(Continued)

OTHER PUBLICATIONS

Peck, Damien. (Victorian Government to remove job seeker details from resumes to improve diversity: The Victorian Government is reducing details on resumes for public service jobs to avoid discrimination for jobseekers. ABC Premium News [Sydney] May 20, 2016.) (Year: 2016).*

(Continued)

*Primary Examiner* — Gabrielle A McCormick
(74) *Attorney, Agent, or Firm* — Zhong Law LLC (57) ABSTRACT A system and method relate to excluding biasing data from talent profiles, including identifying one or more classes of bias, obtaining a first talent profile, wherein the first talent profile comprises an identifier of a person, and a plurality of values characterizing aspects of the person, determining, from the plurality of values, a first value that is indicative of influences over at least one of the one or more classes of bias, and removing or substituting the first value in the first talent profile to generate a second talent profile.

18 Claims, 10 Drawing Sheets

(56) References Cited

U.S. PATENT DOCUMENTS

| | | |
|---|---|---|
| 2005/0004905 A1 | 1/2005 | Dresden |
| 2005/0086186 A1 | 4/2005 | Sullivan et al. |
| 2005/0216295 A1 | 9/2005 | Abrahamsohn |
| 2005/0261956 A1 | 11/2005 | Kato |
| 2006/0235884 A1 | 10/2006 | Pfenniger et al. |
| 2006/0271421 A1 | 11/2006 | Steneker et al. |
| 2007/0047802 A1 | 3/2007 | Puri |
| 2007/0112585 A1 | 5/2007 | Breiter et al. |
| 2009/0144075 A1 | 6/2009 | Flinn et al. |
| 2010/0100398 A1* | 4/2010 | Auker .................. G06Q 50/01 705/4 |
| 2010/0153149 A1 | 6/2010 | Prigge et al. |
| 2010/0153150 A1 | 6/2010 | Prigge et al. |
| 2011/0055098 A1 | 3/2011 | Stewart |
| 2011/0238591 A1* | 9/2011 | Kerr .................. G06Q 10/1053 705/321 |
| 2011/0276505 A1 | 11/2011 | Schmitt |
| 2011/0276507 A1 | 11/2011 | O'Malley |
| 2011/0313940 A1* | 12/2011 | Kerr .................. G06Q 10/1053 705/321 |
| 2013/0096991 A1 | 4/2013 | Gardner et al. |
| 2013/0137464 A1* | 5/2013 | Kramer ................ H04W 4/021 455/456.3 |
| 2013/0290208 A1 | 10/2013 | Bonmassar et al. |
| 2014/0039991 A1 | 2/2014 | Gates et al. |
| 2014/0074738 A1* | 3/2014 | Thankappan .......... G06Q 10/10 705/321 |
| 2014/0122355 A1 | 5/2014 | Hardtke et al. |
| 2014/0282586 A1 | 9/2014 | Shear et al. |
| 2014/0330734 A1 | 11/2014 | Sung et al. |
| 2015/0142711 A1 | 5/2015 | Pinckney et al. |
| 2015/0161567 A1 | 6/2015 | Mondal et al. |
| 2015/0178682 A1 | 6/2015 | Matthews et al. |
| 2015/0244850 A1 | 8/2015 | Rodriguez et al. |
| 2015/0309986 A1 | 10/2015 | Brav et al. |
| 2015/0317610 A1 | 11/2015 | Rao et al. |
| 2016/0012395 A1 | 1/2016 | Omar |
| 2016/0034463 A1 | 2/2016 | Brewer |
| 2016/0034853 A1 | 2/2016 | Wang et al. |
| 2016/0055457 A1 | 2/2016 | Mather et al. |
| 2016/0098686 A1 | 4/2016 | Younger |
| 2017/0061081 A1 | 3/2017 | Jagannathan et al. |
| 2017/0236182 A1* | 8/2017 | Ignatyev ............ G06Q 30/0631 705/26.7 |
| 2017/0243162 A1 | 8/2017 | Gavrielides et al. |
| 2017/0344555 A1 | 11/2017 | Yan et al. |
| 2017/0357945 A1 | 12/2017 | Ashkenazi et al. |
| 2018/0039946 A1 | 2/2018 | Bolte et al. |
| 2018/0150484 A1 | 5/2018 | Dupey et al. |
| 2018/0218330 A1 | 8/2018 | Choudhary et al. |
| 2018/0232751 A1 | 8/2018 | Terhark et al. |
| 2018/0308061 A1 | 10/2018 | Jadda et al. |
| 2018/0336501 A1 | 11/2018 | Le et al. |
| 2018/0357557 A1 | 12/2018 | Williams et al. |
| 2018/0373691 A1 | 12/2018 | Alba et al. |
| 2019/0057356 A1* | 2/2019 | Larsen .................. G06V 40/28 |
| 2019/0066056 A1 | 2/2019 | Gomez et al. |
| 2019/0114593 A1 | 4/2019 | Champaneria |
| 2019/0164176 A1* | 5/2019 | Pydynowski ......... H04L 67/535 |
| 2019/0197487 A1 | 6/2019 | Jersin et al. |
| 2019/0205838 A1 | 7/2019 | Fang et al. |
| 2020/0007336 A1 | 1/2020 | Wengel |
| 2020/0065769 A1 | 2/2020 | Gupta et al. |
| 2020/0117582 A1 | 4/2020 | Srivastava et al. |
| 2020/0160050 A1 | 5/2020 | Bhotika et al. |

OTHER PUBLICATIONS

Pedreschi et al., "Discrimination-Aware Data Mining," Aug. 24-27, 2008, KDD 08, Las Vegas, Nevada, 9 pages.

CUSTOMERGLU "Hire the best candidate for your Company using Artificial Intelligence" (2016), medium.com/SCustomerGlu, 2016, 5 pages.

Barbara Depompa, "Time for a Diversity 'Reboot'", SC Magazine 29:4: 26-29, 2018, Haymarket Media, Inc., pp. 1-4.

Elejalde-Ruiz, What Resume? Hiring is in the Midst of a Tech Revolution; Cutting Costs, Turnover, Eliminating Bias, South Florida Sun-Sentinel, 2018, pp. 1-3.

Sarah K. White, 4 Ways Technology has Changed Recruitment— For Better (and Worse), Cio Cxo Media, Inc., 2017, pp. 1-3.

Sarah Dobson, "Feds Try to Blank Out Bias", Canadian HR Reporter 30, 9, HAB Press Limited, 2017, pp. 1-3.

David Hausman, "How Congress Could Reduce Job Discrimination by Promoting Anonymous Hiring", Stanford Law Review 64.5, 2012, pp. 1343-1369, Stanford University, Stanford Law School.

Hardt et al. "Equality of Opportunity in Supervised Learning," arXiv:1610.02413v1, Oct. 7, 2016, 22 pages.

Liu et al., "Delayed Impact of Fair Machine Learning," arXiv:1803.04383v2, Apr. 7, 2018, 37 pages.

Dixon et al., "Measuring and Mitigating Unintended Bias in Text Classification," Proceeding of the 2018 AAAI/ACM Conf. on AI, Ethics, and Society, Feb. 2-3, 2018, 7 pages.

International Application No. PCT/US2020/012317, International Search Report and Written Opinion mailed Apr. 9, 2020, 8 pages.

\* cited by examiner

EXAMPLE METHOD FOR DETERMINING WHETHER A KEY-VALUE PAIR IS INDICATIVE OR PREDICTIVE OF A PARTICULAR CLASS VALUE

For each of a plurality of key-value pairs and combinations of key-value pairs in the full profiles of candidates in a training set, maintain a count of the number of times the key-value pair or the combination (whichever is applicable) appears for each of the class values
310

↓

For each of the plurality of key-value pairs and combinations of key-value pairs, determine whether the key-value pair or the combination is associated with a particular class value for more than a threshold percentage of candidates in the training set
320

↓

In response to a key value pair or a combination of key-value pairs being associated with a particular class value for more than a threshold percentage (e.g., 80%) of the training candidates, conclude that the key-value pair or the combination is indicative of the class value and, thus, may influence bias with respect to the defined class.
330

EXAMPLE OF METHOD FOR IDENTIFYING KEY-VALUE PAIRS THAT MAY INFLUENCE AGE BIAS
(Using Threshold Method)

Classify each candidate within a training set with an age range using one or more school graduation dates
710

For each a plurality of the key-value pairs and the combinations of key-value pairs in the training candidates' full profiles, maintain a count of the number of times the key-value pair or combination (whichever is applicable) appears for each of the age ranges
720

For each of the key-value pairs and the combinations of key-value pairs, determine if the key-value pair is associated with a particular age range for more than a threshold percentage of the training candidates
730

In response to a key-value pair or a combination of key-value pairs being associated with a particular age range for more than a threshold percentage of the training candidates, conclude that key-value pair or the combination of key-value pairs may influence age bias
740

FIG. 7

ABSTRACTING CANDIDATE DATA TO RELEVANT LEVELS

Identify the keys in a full profile that are relevant for a job role using data from training candidates across a plurality of organizations
810

↓

For relevant keys, identify at what level the values for the key matters most for the job role. In other words, for each of the relevant keys, identify whether the actual value for the key matters most for the job role or whether an abstracted value for the key matters most (*e.g.*, for the "university" key, does the particular university attended by a candidate matter or is whether a candidate went to a top 20% school what matters?).
820

↓

In creating a new profile for a non-training candidate, exclude any key-value pairs that are in the candidate's full profile, but are irrelevant for the job role (based on analysis of training candidate data across organizations)
830

↓

For each of the keys in which an abstracted value matters most for the job role, determine if the candidate's actual value for the key (in the full profile) is encompassed by the relevant abstracted value
840

↓

If the candidate's actual value in the full profile is encompassed by the relevant abstracted value, replace the key-value pair with the relevant abstracted value in the new profile (*e.g.*, replace "MIT" with "top 20% of engineering schools" in the new profile). Otherwise, exclude the key-value pair from the new profile or replace with an abstracted value applicable to the candidate (*e.g.*, "US college").
850

SYSTEM, METHOD, AND COMPUTER PROGRAM FOR AUTOMATICALLY REMOVING DATA FROM CANDIDATE PROFILES THAT MAY INFLUENCE BIAS

CROSS-REFERENCE TO RELATED APPLICATIONS

This application is a continuation of U.S. patent application Ser. No. 16/209,834 filed Dec. 4, 2018, and is a continuation-in-part of U.S. patent application Ser. No. 17/033,575 filed Sep. 25, 2020, which is a continuation of International Patent Application No. PCT/US2020/012317 filed Jan. 6, 2020. The contents of the above-mentioned applications are hereby incorporated by reference in their entireties.

TECHNICAL FIELD

This invention relates generally to human resource applications, and more specifically to removing data from candidate profiles that may influence bias.

BACKGROUND

Many companies and organizations use various HR applications to identify candidates for open job positions. An example of a system that identifies candidates for job openings is described in U.S. patent application Ser. No. 16/121,401, filed on Sep. 4, 2018, and titled "System, Method, and Computer Program for Automatically Predicting the Job Candidates Most Likely to be Hired and Successful in a Job," the contents of which are incorporated by reference herein. Such systems typically display a list of potential candidates and enable a user (e.g., an HR manager) at the organization to view profiles for the potential candidates. The profiles may be resumes, talent profiles, or enhanced talent profiles as described in the incorporated U.S. patent application Ser. No. 16/121,401.

In reviewing candidate profiles, conscious or unconscious biases by reviewers at the organization may cause them to overlook candidates that are well qualified for a job position. A bias may be a type of bias that is generally known to organizations, such as those related to gender, race, or age. Reviewers may also have biases that are unknown to the organization. For example, a reviewer may make assumptions about a candidate based on a hobby listed on the resume. For example, a reviewer looking for a salesperson with an outgoing personality and a "people person" may assume that someone who plays chess is an introvert, which may or may not be true. In such case, if the candidate otherwise meets the qualifications for the job, it would be better to interview the candidate instead of dismissing the candidate based on his/her profile.

To reduce the likelihood of bias in the initial screening process, it would be helpful to remove data from a candidate's profile that may influence bias. Therefore, there is demand for an HR application that not only identifies potential candidates for open job positions, but creates new profiles for the candidates that exclude data that may influence bias.

SUMMARY OF THE DISCLOSURE

The present disclosure describes a system, method, and computer program for removing or replacing information in candidate profiles that may influence bias. The method is performed by a computer system that identifies potential candidates for open job positions and displays profiles for the identified candidates ("the system").

In one embodiment, the system first creates or obtains a "full profile" for a candidate and then creates a "new profile" for the candidate that excludes or substitutes data in the full profile that may influence reviewer bias. The "new profiles" may be the profiles initially displayed to a user screening candidates for an open job position.

In one embodiment, the system excludes or substitutes the following types of information in creating the new profile: (1) data that personally identifies the candidate, such as the candidate's name, and (2) data that is indicative of gender, race, and/or age (or another defined class of bias). In one embodiment, a method for creating a profile for a job candidate that excludes data that may influence reviewer bias comprises the following steps:

defining a class of potential bias;
identifying key-value pairs in candidate data that may influence bias with respected to the defined class by performing the following:
 obtaining a set of training candidates;
 for each candidate in the set, classify the candidate with a value for the class;
 obtain key-value pairs in the candidate data for the training set (the "training candidate data)
 for each of a plurality of key-value pairs in the training candidate data,
  determining if the key-value pair is indicative of a particular class value; and
 in response to a key-value pair being indicative of a particular class value,
  concluding that concluding that the key-value pair may influence bias with respect to the defined class;
obtaining a first profile for a non-training candidate, wherein the first profile includes the non-training candidate's name and one or more key-value pairs identified as influencing bias in the training candidate data; and
creating a second profile for the non-training candidate from the first profile by removing or substituting the non-training candidate's name and the key-value pair(s) identified as influencing bias.

In a further embodiment, the system may also exclude any information in the new profile that is not relevant to the job role for which the candidate is applying. In such embodiments, the system determines what data is relevant for the job for which the candidate is applying and, for data that is relevant, at what level it is relevant (i.e., at the base value or an abstracted level). The system then removes data from the profile that is not relevant for the job role and, where applicable, abstracts some of the remaining data to levels that are relevant for the job role.

DETAILED DESCRIPTION

The present disclosure describes a system, method, and computer program for removing or replacing information in candidate profiles that may influence bias. The method is performed by a computer system that identifies potential candidates for open job positions and displays profiles for the identified candidates ("the system"). An example of the system is described in U.S. patent application Ser. No. 16/121,401 (incorporated herein above).

For each open job position in an organization, the system displays a list (typically ranked) of identified candidates for the job position. A user (e.g., an HR manager) can select any of the candidate and see a profile associated with the candidate. In one embodiment, the initial profile viewed by the user is a "new profile" created by the system from a "full profile" for the candidate. The "full profile" may be the candidate's resume, talent profile, or enhanced talent profile (e.g., the "enhanced talent profile" described in the US patent application Ser. No. 16/121,401, incorporated herein above). The new profile is based on the candidate's full profile, but excludes data that may influence bias. An organization may configure the system to enable the user to see the full profile at a later point in the interviewing/screening process. A method for creating the new profile is described below.

1. Creating a New Candidate Profile from a Candidate's Full Profile

Figure 1:
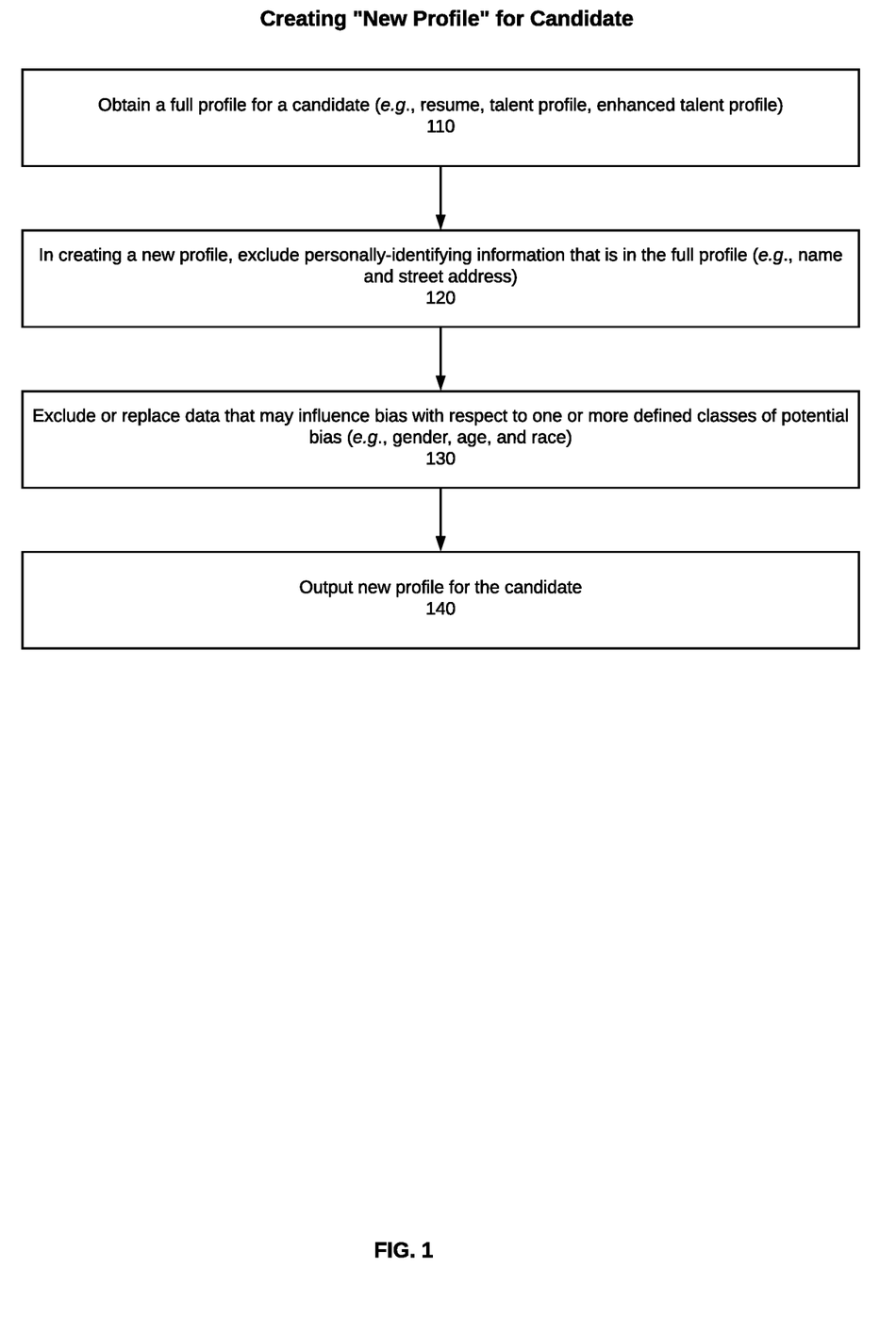
FIG. 1 is a flowchart that illustrates a method for creating a new profile for a candidate that excludes data that may influence bias according to one embodiment.

FIG. 1 illustrates a method for creating a new profile for a candidate that excludes data that may influence bias. The system obtains a full profile for the candidate (step 110). For avoidance of doubt, the term "full profile" or "full candidate profile" herein means any profile (e.g., resume, talent profile, enhanced talent profile, etc.) for the candidate obtained or created by the system before data in the profile is removed or replaced in accordance with the methods described herein.

In creating the new profile, the system excludes personally-identifiable information that is in the full profile, such as name and/or street address information (step 120). The system also excludes or replaces candidate data that may influence bias with respect to one or more defined classes of bias (e.g., gender, race, or age) (step 130). This step is described in more detail with respect to FIGS. 2-7. The system then outputs the new profile, which is displayed in a user interface for the system (step 140).

Figure 2:
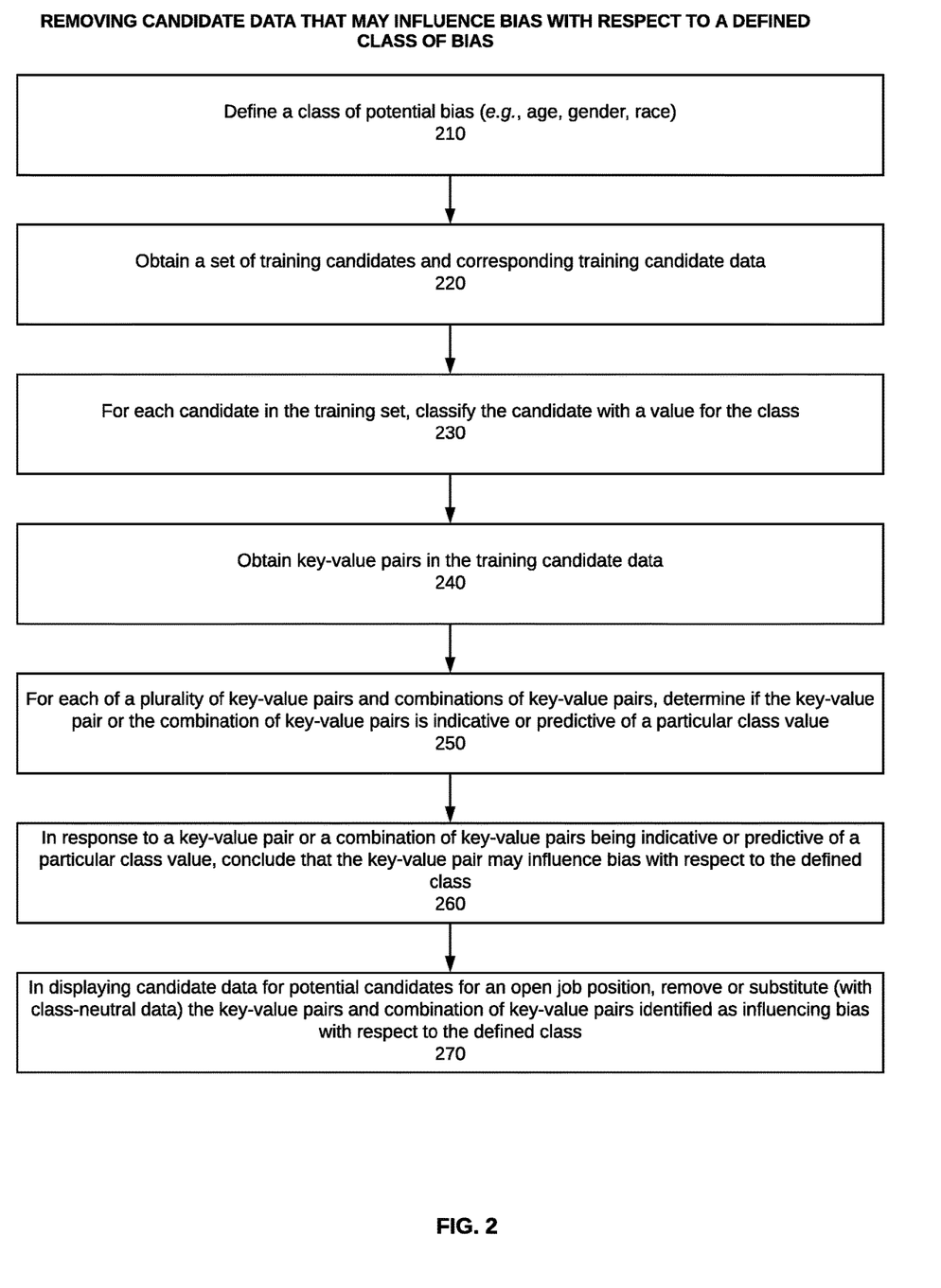
FIG. 2 is a flowchart that illustrates a method, according to one embodiment, for identifying candidate data that may influence bias with respect to a defined class of bias.

2. Identifying Data that May Influence Bias with Respect to a Defined Class of Bias FIG. 2 illustrates a method for identifying data in full candidate profiles that may influence bias with respect to a defined class of bias. The system receives as an input a defined class of bias, such as race, gender, and age (step 210). The defined class may be inputted by a system administrator or a user of the system via a user interface.

The system obtains candidate data for set of training candidates, preferably from across a plurality of organizations and a variety of professions (step 220). The training candidate data includes their full candidate profiles (e.g., a resume, talent profile, or enhanced talent profile) and data that enables each of the candidates to be classified with a class value (e.g., name or school graduation date). The system may obtain the training candidate data from a talent repository managed by the system (or an organization/company) or from public data sources that store job-candidate/employment profiles. The system classifies each of the training candidates with a class value (e.g., male or female) (step 230).

The system obtains key-value pairs from the full candidate profiles of the training candidates (step 240), and for each of a plurality of key-values pairs and combinations of key-value pairs, the system determines if the key-value pair or combination of key-value pairs is indicative of a particular class value (step 250). In response to a key-value pair or a combination of key-value pairs being indicative of a particular class value, the system concludes that the key-value pair or combination of key-value pairs may influence bias with respect to the defined class (step 260). In creating a new profile for a candidate, the system removes or substitutes (with class-neutral data) the key-value pairs and combination of key-value pairs identified as influencing bias with respect to the defined class (step 270). "Neutral" data that serves as a substitute for key-value pairs may be an abstracted form of the key-value pair. For example, a particular US college may be replaced with an abstracted value of the college, such as "4-year US college."

Figure 3:
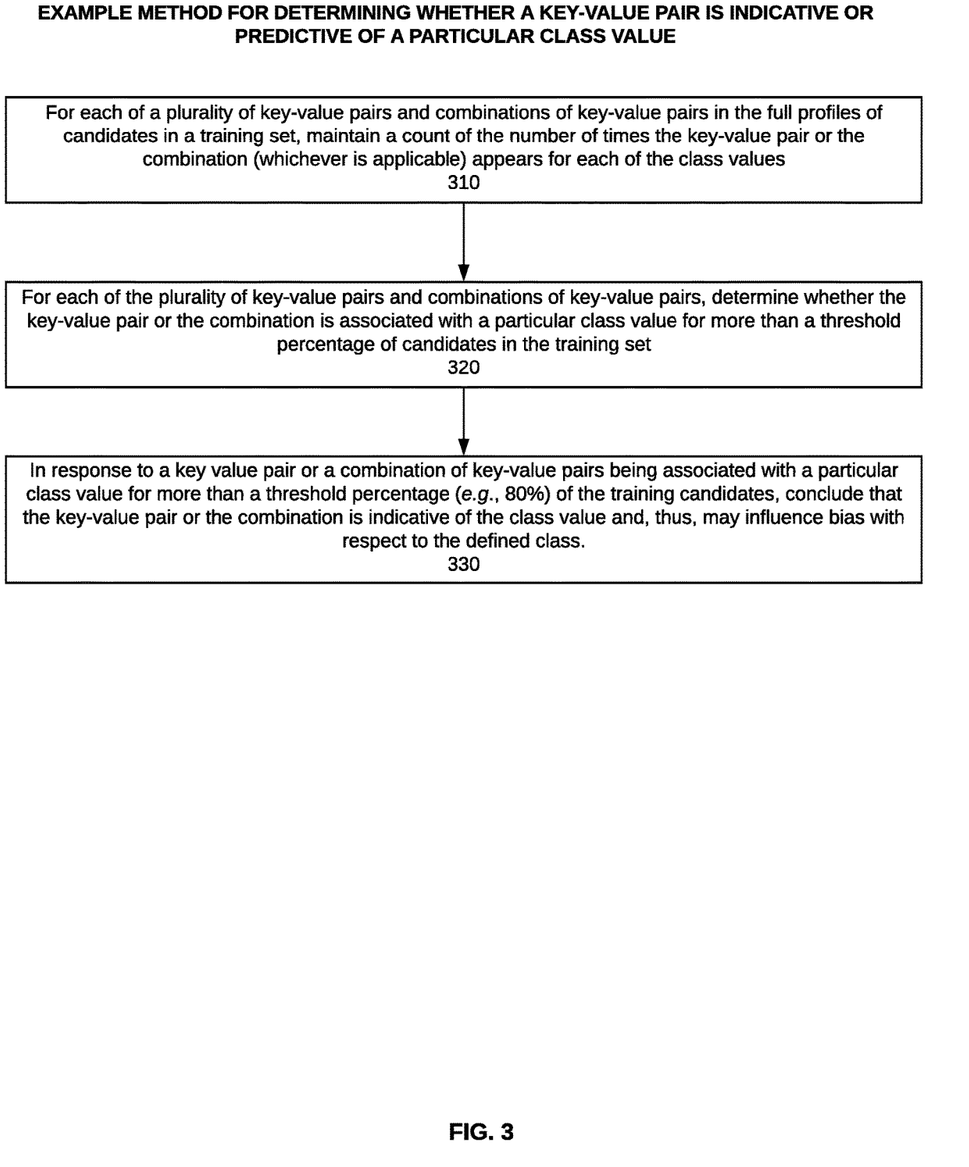
FIG. 3 is a flowchart illustrates a method, according to one embodiment, for determining whether a key-value pair is indicative of a particular class value.

2.1 Determining Whether a Key-Value Pair is Indicative of a Particular Class Value FIG. 3 illustrates a method for determining whether a key-value pair is indicative of a particular class value. This method is referred to herein as the "threshold method" in order to distinguish it from the method of FIG. 3, which is referred to as the "machine learning method." For each of a plurality of key-value pairs and combinations of key-value pairs in the full profiles of the training candidates, the system maintains a count of the number of times the key-value pair or the combination of key-value pairs appears for each of the class values (step 310), and determines whether the key-value pair or the combination (whichever is applicable) is associated with a class value for more than a threshold percentage (e.g., 80%) of candidates in the training set (step 320). If a key-value pair or a combination of key-value pairs is associated with a particular class value for more than the threshold percentage of candidates, the system concludes the key-value pair or the combination of key value-pairs (whichever is applicable) is indicative of the class value and, thus, may influence bias with respect to the defined class (step 330).

Figure 4:
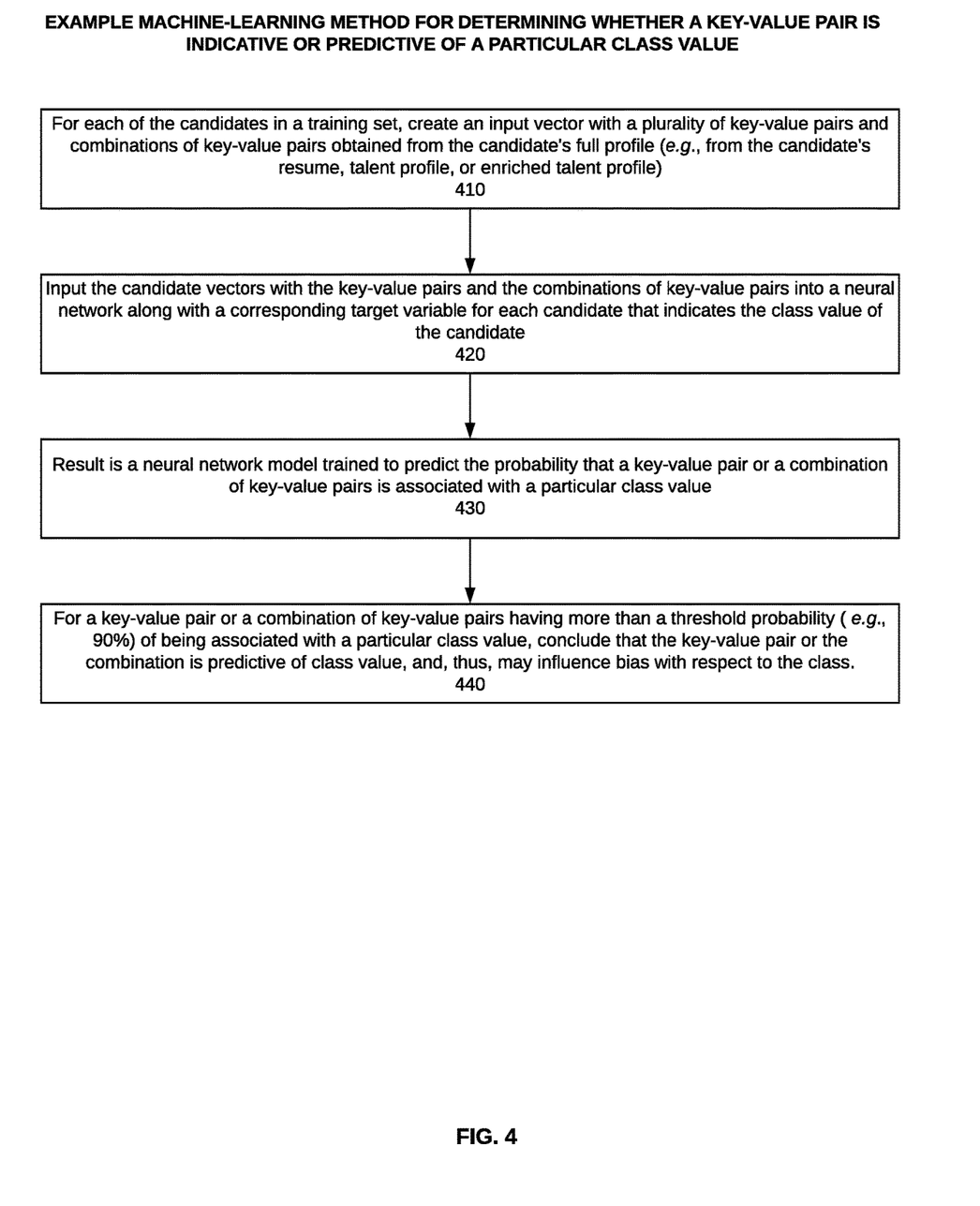
FIG. 4 is a flowchart that illustrates a method, according to an alternate embodiment, for determining whether a key-value pair is indicative of a particular class value.

FIG. 4 illustrates an alternate method for determining whether a key-value pair is indicative of a particular class value. This method uses a neural network, such as a deep neural network, and, as stated above, is referred to herein as the "machine-learning method." For each of the candidates in the training set, the system creates an input vector for the candidate with a plurality of key-value pairs and combination of key-value pairs obtained from the training candidate's full profiles (step 410). The input vectors may include all the key-value pairs in the full profiles or just a subset of key-value pairs. To train a neural network, the system inputs the vectors for each of the training candidates into the neural network, along with a corresponding target variable for each of the candidates that indicates the class value of the candidate (step 420). The result is a neural network that is trained to predict the probability that a key-value pair or combination of key-value pairs is associated with a particular class value (step 430). For a key-value pair or a combination of key-value pairs having more than a threshold probability (e.g., 90%) of being associated with a particular class value, the system concludes that the key-value pair or the combination of key-value pairs (whichever is applicable) is indicative of class value, and, thus, may influence bias with respect to the class (step 440).

The methods of FIGS. 3 and 4 could be applied to just individual key-value pairs (and not combinations of key-value pairs).

Figure 5:
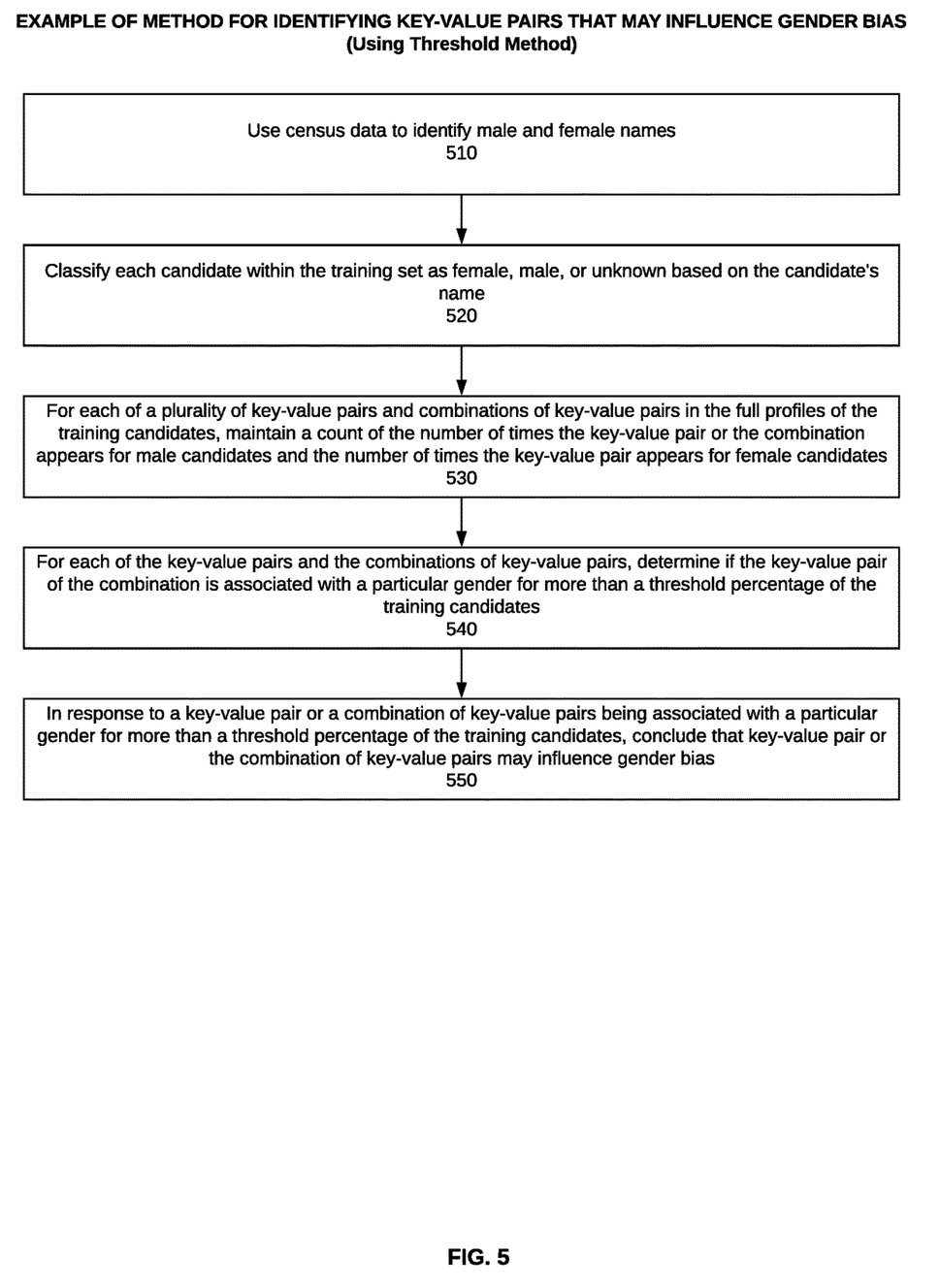
FIG. 5 is a flowchart that illustrates an example method for identifying key-value pairs that may influence gender bias.

2.2 Example Method for Identifying Key-Value Pairs that May Influence Gender Bias FIG. 5 illustrates an example method for identifying key-value pairs that may influence gender bias. This example uses the threshold method described above with respect to FIG. 3, but the machine learning method could be used instead. Census data is inputted or imported into the system, which analyzes the data to identify male and female names (step 510). Specifically, names used for a threshold percentage (e.g., 90%) of one gender are classified as associated with that gender. The system uses this information to classify each candidate in the training set as female, male, or unknown based on the candidate's name (step 520).

For each of a plurality of key-value pairs and combinations of key-value pairs in the full profile of the training candidates, the system maintains a count of the number of times the key-value pair (or the combination) appears for male candidates and the number of times the key-value pair (or the combination) appears for female candidates (step 530), and determines whether the key-value pair or the combination (whichever is applicable) is associated with a particular gender for more than a threshold percentage (e.g., 80%) of candidates in the training set (step 540). If a key-value pair or a combination of key-value pairs is associated with a particular gender for more than the threshold percentage of candidates, the system concludes the key-value pair or the combination of key value-pairs (whichever is applicable) is indicative of the class value and, thus, may influence gender bias (step 550).

Figure 6:
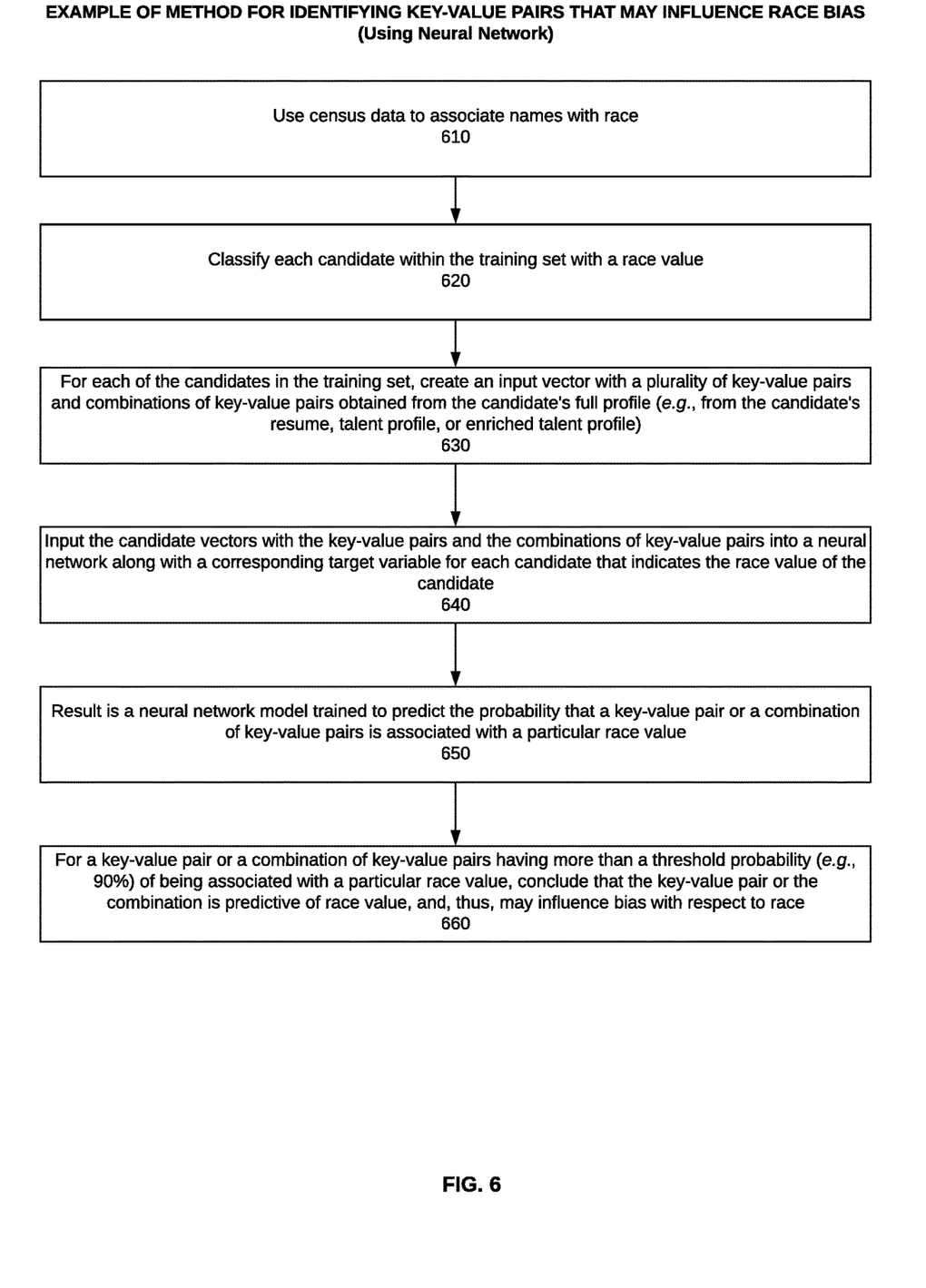
FIG. 6 is a flowchart that illustrates an example method for identifying key-value pairs that may influence race bias.

2.3 Example Method for Identifying Key-Value Pairs that May Influence Race Bias FIG. 6 illustrates an example method for identifying key-value pairs that may influence race bias. This example uses the machine-learning method described above with respect to FIG. 4, but the threshold method could be used instead. Census data is inputted or imported into the system, which analyzes the data to associate names with races (step 610). Specifically, names used for a threshold percentage (e.g., 90%) of one race are classified as associated with that race value. The system uses this information to classify each candidate in the training set with a race value (which may include "unknown") based on the candidate's name (step 620).

For each of the training candidates, the system creates an input vector for the training candidate with a plurality of key-value pairs and combination of key-value pairs obtained from the training candidate's full profile (step 630). To train a neural network, the system inputs the vectors for each of the training candidates into the neural network, along with the candidate's race value (step 640). The result is a neural network that is trained to predict the probability that a key-value pair or a combination of key-value pairs is associated with a particular race value (step 650). For a key-value pair or a combination of key-value pairs having more than a threshold probability (e.g., 90%) of being associated with a particular race value, the system concludes that the key-value pair or the combination of key-value pairs (whichever is applicable) is indicative of race value, and, thus, may influence racial bias (step 660).

Figure 7:
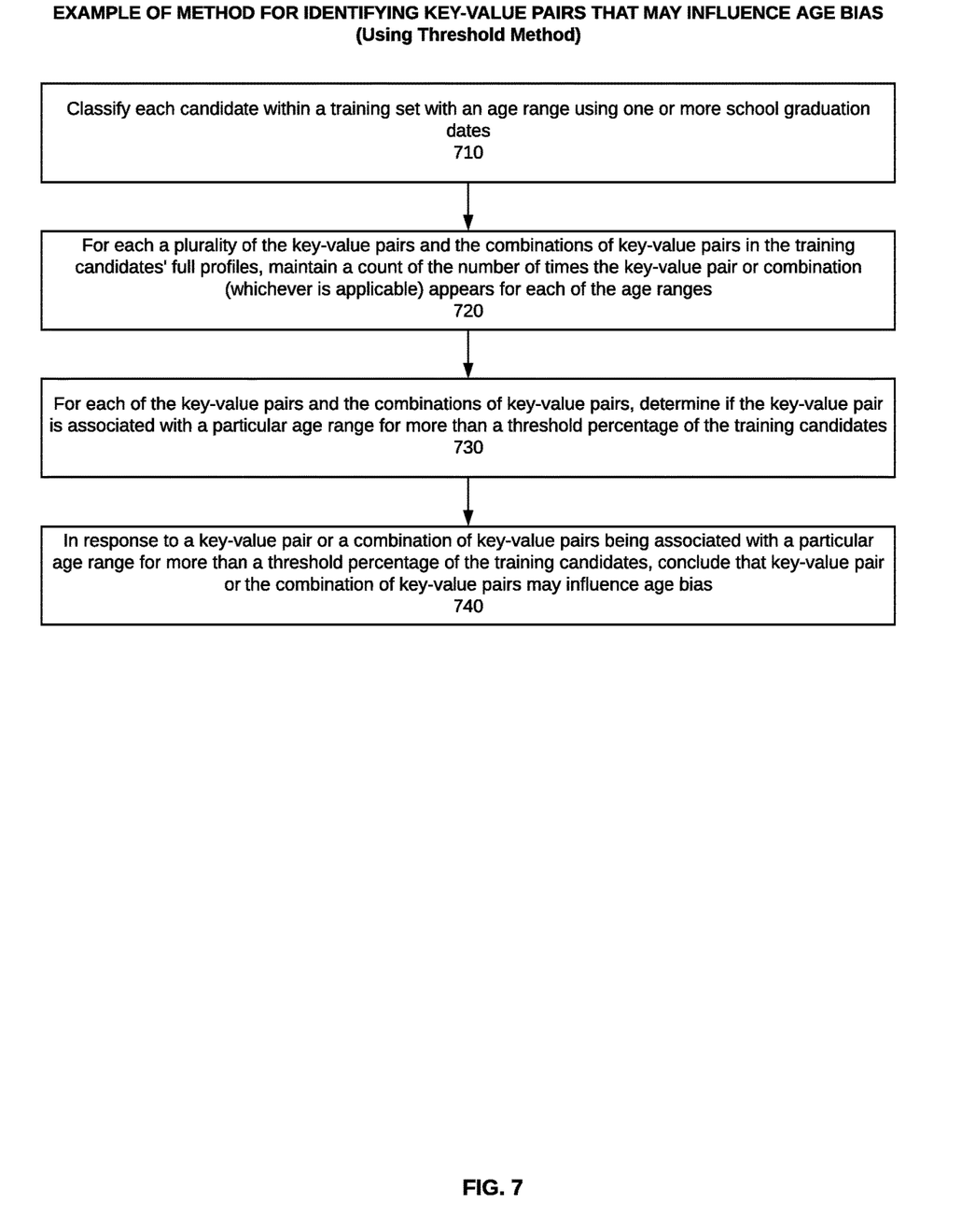
FIG. 7 is a flowchart that illustrates an example method for identifying key-value pairs that may influence age bias.

2.4 Example Method for Identifying Key-Value Pairs that May Influence Age Bias FIG. 7 illustrates an example method for identifying key-value pairs that may influence age bias. This example uses the threshold method described above with respect to FIG. 4, but the machine learning method could be used instead. The system analyzes high school or college graduation dates, and uses these dates to classify each of the candidates in a training set with an age range value (e.g., 20-30 years old, 30-40 years old, etc.) (step 710). For example, in the year 2020, the system may classify someone that graduated from college in the year 2018, with a "20-30-year-old" age range.

For each of a plurality of key-value pairs and combinations of key-value pairs in the full profiles of the training candidates, the system maintains a count of the number of times the key-value pair (or the combination) appears for each of the age ranges (step 720), and determines whether the key-value pair or the combination (whichever is applicable) is associated with a particular age range for more than a threshold percentage (e.g., 80%) of candidates in the training set (step 730). If a key-value pair or a combination of key-value pairs is associated with a particular age range for more than the threshold percentage of candidates, the system concludes the key-value pair or the combination of key value-pairs (whichever is applicable) is indicative of age and, thus, may influence age bias (step 740).

3. Further Embodiments—Abstracting Candidate Data to Relevant Levels

In certain embodiments, creating a new profile for candidate also includes removing any data that is not relevant to the job role for which the candidate is applying. The methods describe above with respect to FIGS. 2-7 reduce the likelihood that a reviewer is influenced by a known type of bias, such as gender, race, or age, whereas abstracting candidate profiles to only what is relevant for a job also reduces the likelihood of a reviewer being influenced by reviewer-specific biases that may be unknown to the organization. For example, a particular reviewer may make assumptions about a candidate based on a hobby listed by the candidate, and the candidate's hobbies may not be relevant for obtaining or succeeding at the job for which the candidate is applying.

Figure 8:
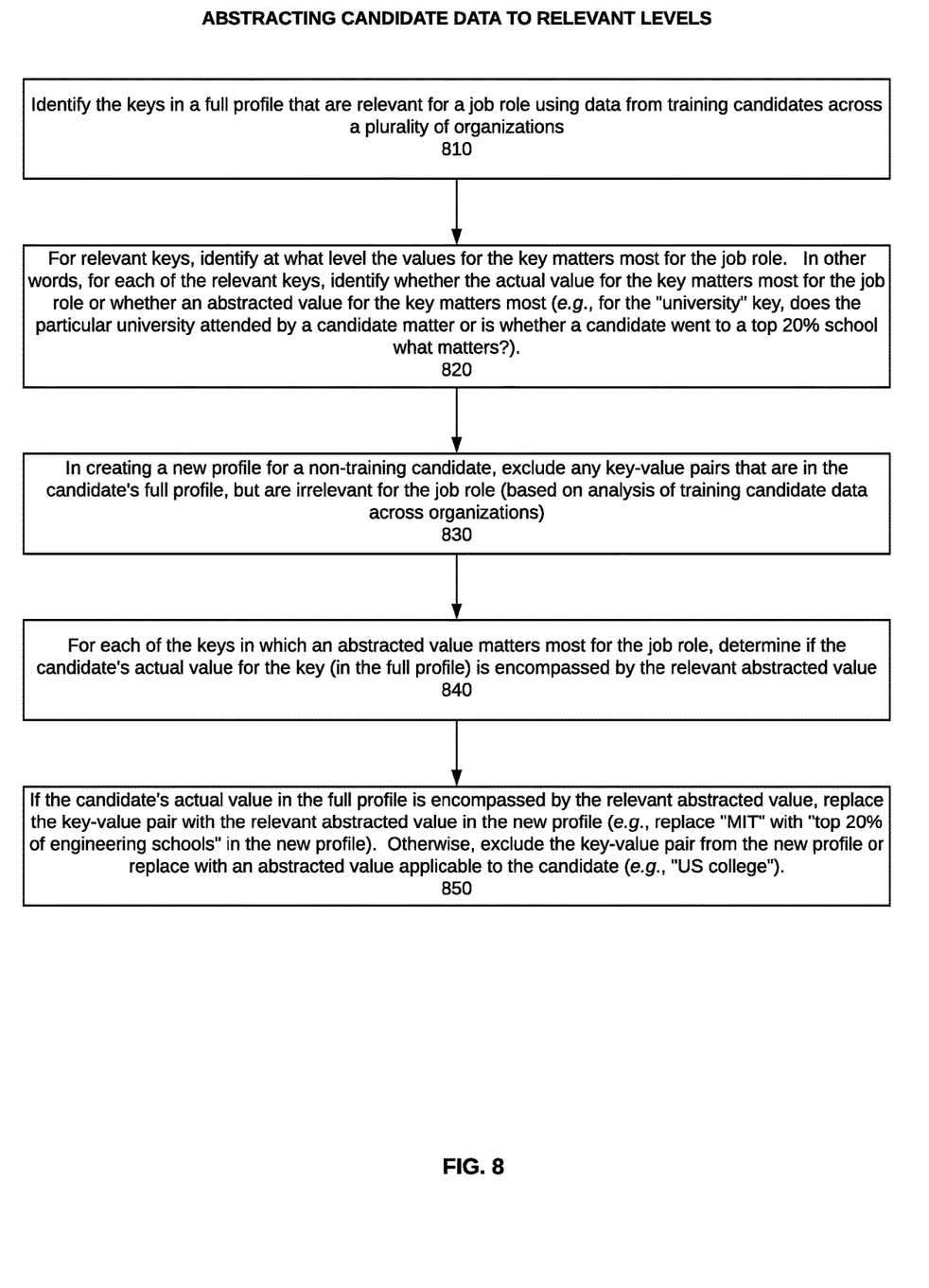
FIG. 8 is a flowchart that illustrates a method, according to one embodiment, for abstracting candidate data to relevant levels for a job role.

FIG. 8 illustrates a method for abstracting candidate data to relevant levels for a job role. The system identifies the keys (i.e., the fields) in a full candidate profile that are relevant for a job role using training candidate data, preferably from across a plurality of organizations (step 810). The training candidate data may be obtained from a talent repository maintained by the system or an organization, or from public data sources with employment profile data. Methods for performing this step are described with respect to FIGS. 9-10. If key-value pairs have already been eliminated or substituted in accordance with the method of FIG. 2, then this is performed for the remaining keys in the candidate's full profile.

For each of the relevant keys, the system identifies at what level the key matters most for the job role (step 820). In other words, for each of the relevant keys, the system identifies whether the actual value for the key matters most or whether an abstracted value for a key matters most. For example, for the "university" key, does the particular university attended by a candidate matter or is whether a candidate went to a top 20% school what matters?

In creating the new profile for the candidate, the system excludes any key-value pairs that are in the full candidate profile but are irrelevant for the job role (step 830). For each of the relevant keys in which an abstracted value matters most for the job role, the system determines whether the candidate's actual value for the key is encompassed by the relevant abstracted value (step 840). For example, if what matters most for the "university" key is whether a candidate went to a top 20% school, then system determines whether the university attended by the candidate is a top 20% school. They system may use published or inputted university rankings to make this determination.

If the candidate's actual value in his/her full profile is encompassed by the relevant abstracted value, the system replaces the key-value pair in the candidate's full profile with the relevant abstracted value in the new profile (step 850). For example, the system may replace "Massachusetts Institute of Technology" in a full profile with "top 20% of engineering schools" in the new profile. Otherwise, the system either excludes the key-value pair from the new profile or replaces the key-value pair with an abstracted value relevant to the candidate in the new profile, depending on how the system is configured (also step 850). For example, if the candidate attended a 4-year college that is not ranked in the top 20% of schools (according to the ranking(s) used by the system), then the system may not specify college information for the candidate or the system may replace the candidate's specific college with something like "US university." Key-value pairs that are not abstracted or removed in accordance with step 850 remain in the new profile.

If a candidate applies for multiple job positions at an organization, then the system may create a new profile for the candidate for each of the job roles, as what is relevant for one job role may not be relevant for another job role.

3.1 Identifying Relevant Keys and Abstraction Levels for Key-Value Pairs

Figure 9:
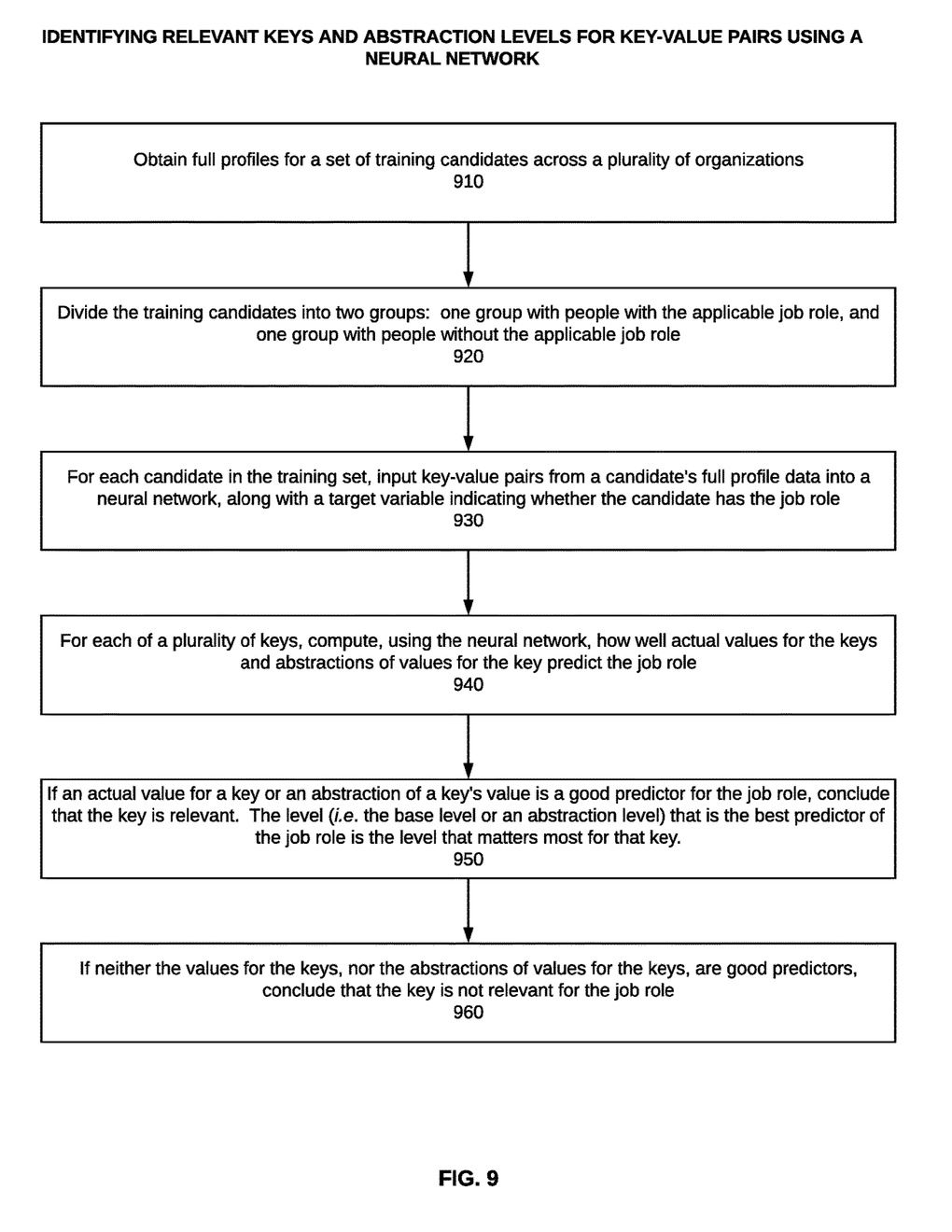
FIG. 9 is a flowchart that illustrates a method, according to one embodiment, for determining what keys in candidate data are relevant for a job role, and, for keys that are relevant, at what level the key matters most.
Figure 10:
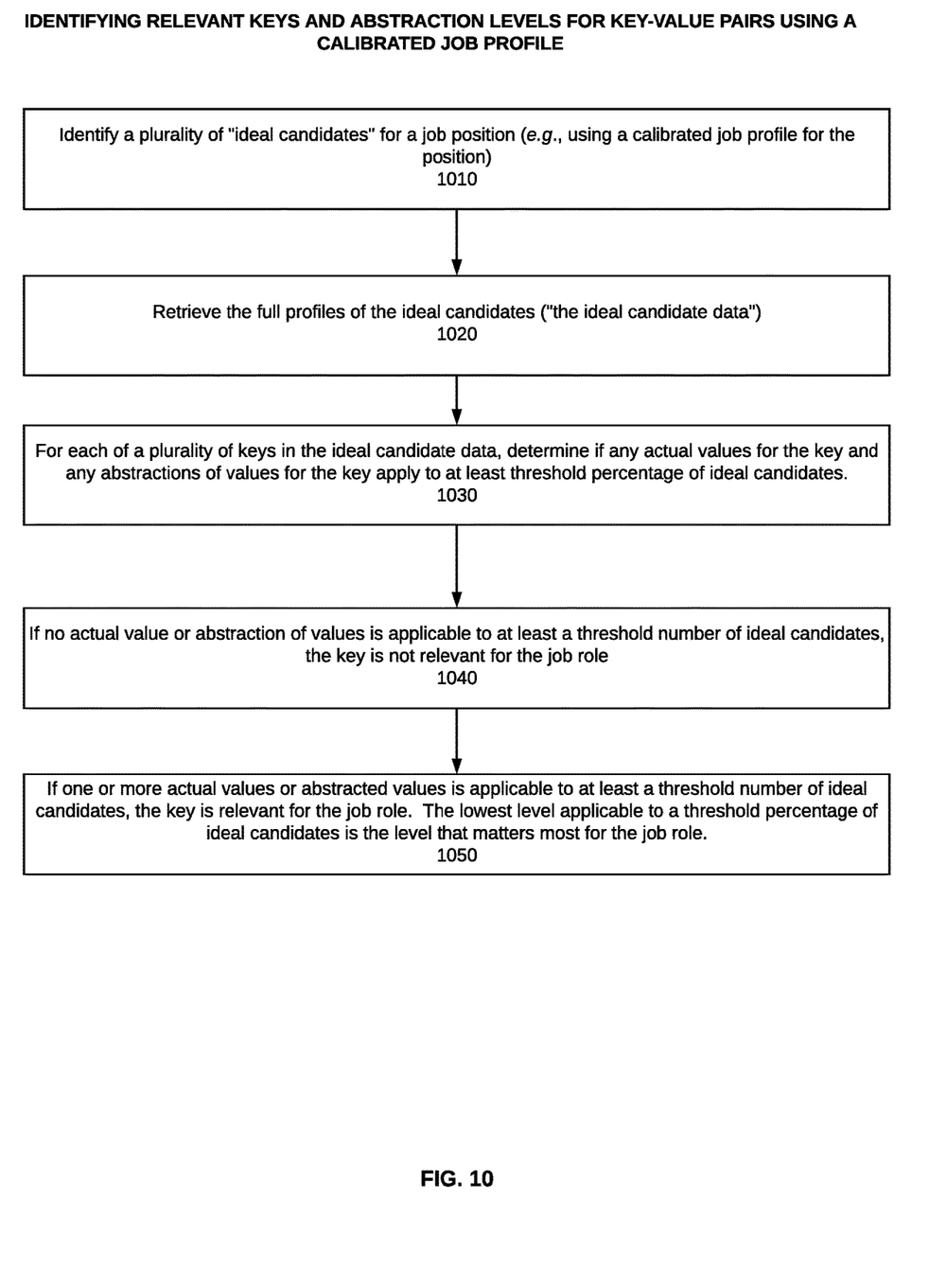
FIG. 10 is a flowchart that illustrates a method, according to an alternate embodiment, for determining what keys in candidate data are relevant for a job role, and, for keys that are relevant, at what level the key matters most.

FIGS. 9 and 10 illustrate two different methods for determining which keys in the candidate data are relevant for a particular job role and, for keys that are relevant, determining at what level the key matters most (i.e., at the base level or at an abstracted level). FIG. 9 uses a neural network, and FIG. 10 uses data from "ideal candidates" for a job position.

Turning to FIG. 9, the system obtains full profiles for a set of training candidates, preferably comprising people from across a plurality of organizations (step 910). The training set includes both people who have never held the applicable job role and people who currently have or have previously had the applicable job role. The system divides the candidates in the training set into two groups: One group with people who have or have had the applicable job role, and one group with people who have not held the applicable job role (step 920). For each candidate in the set, the system inputs key-value pairs from the candidate's full profile (in the form of an input vector) into a neural network, along with a target variable indicating whether the candidate has (or has had) the job role. In one embodiment, the neural network is a recurring neural network (RNN).

For each of a plurality of keys in the candidate data, the system computes, using the neural network, how well actual values for the keys and abstractions of values for the keys predict the job role (step 940). The "abstracted values" may be preconfigured by a system administrator or may be determined automatically by clustering values for keys into groups, where a group encompasses multiple values. The system may test multiple abstraction levels for a key.

If an actual value for a key or an abstraction of a key's value is a good predictor for the job role, the system concludes that the key is relevant (step 950). The level (i.e., the base level or an abstracted level) that is the best predictor of the job role is the level that matters most for the key. For example, for the "undergraduate college" key, if "top 20% school" is a better predictor than a particular university value (e.g., "Stanford"), then "top 20% school," which is an abstracted value, is the level that matters most for that key. Conversely, if for the "skills" key, the value "java" is a better predictor for a job role than an abstracted value that encompasses a wider range of skills, then the base level (i.e., the actual value) for the key is the level that matters most for that key. If neither the actual values for a key, nor abstractions of values for a key, are good predictors, the system concludes that the key is not relevant for the job role (step 960).

FIG. 10 illustrates an alternate method for identifying the relevant keys and abstraction levels for a job role. The system identifies a plurality of "ideal candidates," across organizations, for a job role, and retrieves full profiles for the ideal candidates ("the ideal candidate data") (steps 1010, 1020). In one embodiment, the system obtains ideal candidate data using a calibrated job profile for the job role. Calibrated job profiles are described in U.S. patent application Ser. No. 16/121,401 which is incorporated by reference herein above.

For each of a plurality of keys in the ideal candidate data, the system determines if any actual values for the key and any abstractions of values for the key apply to a least a threshold percentage (e.g., 80%) of ideal candidates (step 1030). If no actual value or abstraction of values is applicable to at least a threshold number of ideal candidates, the system concludes that the key is not relevant for the job role (step 1040). If one or more actual values or abstracted values is applicable to at least a threshold number of ideal candidates, the system concludes that the key is relevant for the job role (step 1050). The lowest level applicable to a threshold percentage of ideal candidates is the level that matters most for the job role. For example, if both an abstracted value for a key and a particular actual value for a key apply to at least a threshold percentage of ideal candidates, the base level (actual value) for the key is the level that matters most for that key.

4. General

The methods described herein are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As stated an example of a computer system for performing the methods described herein is set forth in U.S. patent application Ser. No. 16/121,401 (incorporated herein above). In addition to the software modules described in U.S. patent application Ser. No. 16/121,401, the system may have a software module for performing the methods described herein.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

What is claimed is:

1. A method for excluding biasing data from talent profiles, and generating and presenting updated talent profiles, the method comprising:
    identifying one or more classes of bias influencing a profile reviewer;
    obtaining a first talent profile, wherein the first talent profile comprises an identifier of a person, and a plurality of key-value pairs characterizing aspects of the person;
    determining, from the plurality of key-value pairs, a first value that is indicative of influences over at least one of the one or more classes of bias, wherein determining, from the plurality of key-value pairs, a first value that is indicative of influences over at least one of the one or more classes of bias further comprises determining, using a neural network model from the plurality of key-value pairs, the first value that is indicative of influences over the at least one of the one or more classes of bias;
    substituting the first value in the first talent profile using a class-neutral value to generate a second talent profile that is a bias-neutral version of the first talent profile;
    identifying a second plurality of key-value pairs in the first talent profile, wherein the second plurality of key-value pairs are remaining key-value pairs that are not substituted using the class-neutral value;
    determining, whether one or more keys in the second plurality of key-value pairs are relevant to a job role;
    generating a third talent profile by:
        for each of the one or more keys that is determined irrelevant to the job role, excluding the corresponding key-value pair from the second talent profile;
        for each of the one or more keys that is determined relevant to the job role, determining an abstracted value that is relevant to the job role and encompasses the value, and replacing the value in the corresponding key-value pair with the abstracted value in the second talent profile; and presenting the third talent profile to the profile reviewer.

2. The method of claim 1, further comprising substituting the identifier associated with the person from the first talent profile to generate the second talent profile, wherein the identifier is at least one of a name of the person or an education institute.

3. The method of claim 1, wherein one or more parameters of the neural network are adjusted according to a training dataset, and wherein the neural network when executed is to predict a probability that a value of an input talent profile is indicative of influences over a particular class of bias, and to determine that the value is indicative of influences over the particular class of bias responsive to the value having at least a threshold probability value associated with the particular class.

4. The method of claim 1, wherein determining, from the plurality of key-value pairs, first value that is indicative of influences over at least one of the one or more classes of bias further comprises:
    obtaining the plurality of key-value pairs from the first talent profile;
    for each of the plurality of key-value pairs, determining if a count of the value being associated with candidates subjecting to a particular class of bias is greater than a threshold percentage of all candidates in the training dataset; and
    in response to the count of the value being associated with the candidates subjecting to the particular class of bias is greater than the threshold percentage of all candidates in the training dataset, concluding that the value is indicative of influences over the particular class.

5. The method of claim 1, wherein the one or more classes of bias comprises at least one of gender bias, racial bias, or age bias.

6. The method of claim 5, further comprising responsive to determining that the at least one class is the gender bias,
    using a survey of population dataset to identify male and female names; and
    classifying each talent profile in a training dataset as one of female, male, or unknown based on a name in the talent profile.

7. The method of claim 5, further comprising responsive to determining that the at least one class is the racial bias,
    using a survey of population dataset to associate names with a race; and
    classifying each talent profile in a training dataset with a corresponding race value based on a name in the talent profile.

8. The method of claim 5, further comprising responsive to determining that the at least one class is the age bias,
    classifying each talent profile in a training dataset with an age range using one or more education landmark dates.

9. The method of claim 1, wherein substituting the first value in the first talent profile comprises substituting the first value with an abstraction of the first value, and wherein the first value is a specific identification of an entity and the abstraction is a generic description of the entity that does not reveal a true identity of the entity.

10. A computer system for excluding biasing data from talent profiles, and generating and presenting updated talent profiles, the computer system comprising:
    a memory; and
    one or more processors, communicatively coupled to the memory, to:
        identify one or more classes of bias influencing a profile reviewer;

obtain a first talent profile, wherein the first talent profile comprises an identifier of a person, and a plurality of key-value pairs characterizing aspects of the person;

determine, from the plurality of key-value pairs, a first value that is indicative of influences over at least one of the one or more classes of bias, wherein determining, from the plurality of key-value pairs, a first value that is indicative of influences over at least one of the one or more classes of bias further comprises determining, using a neural network model from the plurality of key-value pairs, the first value that is indicative of influences over the at least one of the one or more classes of bias;

substitute the first value in the first talent profile using a class-neutral value to generate a second talent profile that is a bias-neutral version of the first talent profile;

identify a second plurality of key-value pairs in the first talent profile, wherein the second plurality of key-value pairs are remaining key-value pairs that are not substituted using the class-neutral value;

determine whether one or more keys in the second plurality of key-value pairs are relevant to a job role;

generate a third talent profile by:
  for each of the one or more keys that is determined irrelevant to the job role, excluding the corresponding key-value pair from the second talent profile;
  for each of the one or more keys that is determined relevant to the job role, determining an abstracted value that is relevant to the job role and encompasses the value, and replacing the value in the corresponding key-value pair with an abstracted value in the second talent profile; and
present the third talent profile to the profile reviewer.

11. The computer system of claim 10, wherein the one or more processors are further to substitute the identifier associated with the person from the first talent profile to generate the second talent profile, wherein the identifier at least one of a name of the person or an education institute.

12. The computer system of claim 10, wherein one or more parameters of the neural network are adjusted according to a training dataset, and wherein the neural network when executed is to predict a probability that a value of an input talent profile is indicative of influences over a particular class of bias, and to determine that the value is indicative of influencing the particular class of bias responsive to the value having at least a threshold probability value associated with the particular class.

13. The computer system of claim 10, wherein to determine, from the plurality of key-value pairs, first value that is indicative of influences over at least one of the one or more classes of bias, the one or more processors are further to:
  obtain the plurality of key-value pairs from the first talent profile;
  for each of the plurality of key-value pairs, determine if a count of the value being associated with candidates subjecting to a particular class of bias is greater than a threshold percentage of all candidates in the training dataset; and
  in response to the count of the value being associated with the candidates subjecting to the particular class of bias is greater than the threshold percentage of all candidates in the training dataset, conclude that the value is indicative of influences over the particular class.

14. The computer system of claim 10, wherein the one or more classes of bias comprises at least one of gender bias, racial bias, or age bias.

15. The computer system of claim 14, wherein responsive to determining that the at least one class is the gender bias, the one or more processors are to:
  use a survey of population dataset to identify male and female names; and
  classify each talent profile in a training dataset as one of female, male, or unknown based on a name in the talent profile.

16. The computer system of claim 14, wherein responsive to determining that the at least one class is the racial bias, the one or more processors are to:
  use a survey of population dataset to associate names with a race; and
  classify each talent profile in a training dataset with a corresponding race value based on a name in the talent profile.

17. The computer system of claim 14, wherein responsive to determining that the at least one class is the age bias, the one or more processors are to classify each talent profile in a training dataset with an age range using one or more education landmark dates.

18. A non-transitory computer-readable medium stored therein a computer program, that, when executed by one or more processors of a computer system for excluding biasing data from talent profiles, and generating and presenting updated talent profiles, the one or more processors to:
  identify one or more classes of bias influencing a profile reviewer;
  obtain a first talent profile, wherein the first talent profile comprises an identifier of a person, and a plurality of key-value pairs characterizing aspects of the person;
  determine, from the plurality of key-value pairs, a first value that is indicative of influences over at least one of the one or more classes of bias, wherein determining, from the plurality of key-value pairs, a first value that is indicative of influences over at least one of the one or more classes of bias further comprises determining, using a neural network model from the plurality of key-value pairs, the first value that is indicative of influences over the at least one of the one or more classes of bias; and
  substitute the first value in the first talent profile using a class-neutral value to generate a second talent profile that is a bias-neutral version of the first talent profile;
  identify a second plurality of key-value pairs in the first talent profile, wherein the second plurality of key-value pairs are remaining key-value pairs that are not substituted using the class-neutral value; determine whether one or more keys in the second plurality of key-value pairs are relevant to a job role;
  generate a third talent profile by:
    for each of the one or more keys that is determined irrelevant to the job role, excluding the corresponding key-value pair from the second talent profile;
    for each of the one or more keys that is determined relevant to the job role, determining an abstracted value that is relevant to the job role and encompasses the value, and replacing the value in the corresponding key-value pair with an abstracted value in the second talent profile; and
  present the third talent profile to the profile reviewer.

* * * * *